United States Patent Office 3,534,014
Patented Oct. 13, 1970

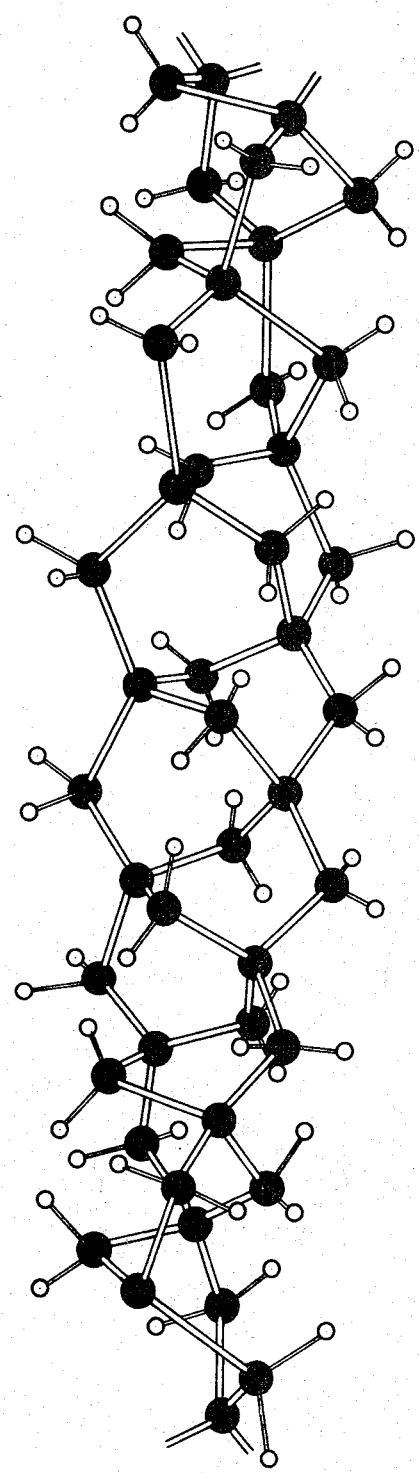
Cyclized Polyallene

3,534,014
SOLUBLE LADDER SPIRO POLYMER
Robert E. Rinehart, Wayne, N.J., assignor to Uniroyal, Inc., New York, N.Y., a corporation of New Jersey
Filed Aug. 29, 1968, Ser. No. 756,278
Int. Cl. C08d 3/04
U.S. Cl. 260—94.2    17 Claims

ABSTRACT OF THE DISCLOSURE

The present invention relates to the hydrocarbon polymer resulting from the cyclization of 1,2-polyallene.

---

The present invention relates to a novel hydrocarbon polymer which was the properties of both a ladder and a spiro polymer. A ladder polymer is one wherein substantially parallel chains of repeating units are linked together at more or les regular intervals to form what looks like a ladder structure. A spiro polymer is one wherein a series of ring units are attached at a common atom.

Ladder polymers and spiro polymers have great utility because of superior resistance to aging in the presence of heat and/or light. An examination of the types of degradation commonly encountered when hydrocarbon polymers are exposed to heat and/or light, makes clear the reason for increased aging resistance of ladder and spiro polymers. This is a typical polymer chain having repeating units, $a, b, c, d, e, f, g$, a typical degradative reaction leading to a scission between atoms along the chain, as for example between atoms $c$ and $d$ would break the original long polymer chain into two shorter chains as shown schematically:

[a b c d e f g] ⟶ [a b c] + [d e f g]

For every such chain-scission reaction which occurs, two new polymer chains of lower molecular weight are produced. Thus repeated scissions lead to a decrease in the average molecular weight of the polymer.

Resistance to aging is exhibited by polymers which consist of ladder structures. As noted above, such structures are comprised of more than one chain of atoms, linked together at more or less regular intervals. In such structures, one chain scission cannot lead to lower molecular weight. A schematic example of a ladder structure, is shown as follows:

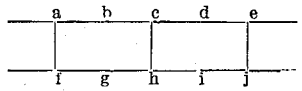

If for example, the bond between atoms $c$ and $d$ were ruptured, there would be no resulting decrease in molecular weight of the polymer because the chain would still be held together by the other atoms of the ladder structure. Even after the bond between $c$ and $d$ had been ruptured, it is unlikely by statistical probability that if a second bond were broken, a decrease in molecular weight would result. Thus in the schematic example, there will be a decrease in molecular weight if bond $hi$ or $ij$ is broken, and no decrease if bonds $ab$, $cb$, $de$, $af$, $ch$, $fg$, or $gh$ are broken. There will be a decrease in molecular weight if bond $ej$ is broken, only if $ej$ is the last connecting link between the two polymer chains.

Spiro polymers exhibit stability similar to ladder polymers. In spiro polymers, two or more polymer chains are attached at a common atom, involving usually (always in the case of hydrocarbon polymer) four atoms of two chains joined to a single atom. Such polymers may be represented schematically as follows:

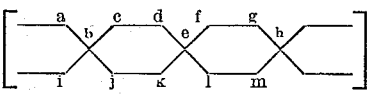

Thus if by a process of random scission, the bond between atoms $c$ and $d$ is broken there will be no decrease in molecular weight. Rupture of bonds $ab$ or $bi$ will result in a decrease in molecular weight only if atom $b$ is the last atom in common to chains which include atoms $a$ or $i$. After bond $cd$ has been ruptured, a process of random chain scission wil produce two chains if bonds $bj$, $jk$, or $ke$ are broken, but not if bonds $bc$, $de$, $ef$, $fg$, $gh$, $el$, $lm$, or $mh$ are broken.

Ideally, the most stable polymer structures consist of ladder or spiro polymers of high molecular weight, containing no defects or breaks in the ladder or spiro structure. In practice, it is found that such structures are difficult to synthesize, and ladder polymers, for example, are obtained containing breaks in the ladder structure such as illustrated below:

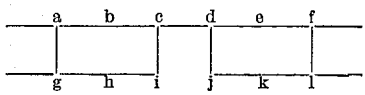

In such a structure a decrease in molecular weight would be produced if rupture occurred at bond $cd$. By a process of random bond scission, it is statistically unlikely that bond $cd$ would be the one ruptured. However, it is recognized that the more breaks there are in the polymeric ladder structure, as at $cd$, the more likely it is that random scission leads to a decrease in molecular weight upon rupture of a single bond.

Various methods can be used to improve the stability of ladder or spiro polymers. For example, improvements in syntheses which minimize the defects or breaks in the ladder or spiro structure, reduce the likelihood that a single bond rupture leads to a decrease in molecular weight. As another example, the synthesis of more complicated networks, such as those characterized by more than two polymer chains joined by ladder or spiro links, reduce the likelihood that some portions of the chain are held together by a single bond.

The present invention describes a thermally stable hydrocarbon polymer which consists of a network containing features of both ladder as well as spiro polymers, and the preparation of same.

Specifically, this invention relates to cyclized 1,2-polyallene, a ladder spiro polymer, and to the preparation of same from soluble polymers prepared from allenes, for example 1,2 propadiene (wherein significant portions of such allene polymer consist of a repeating unit structure arising from 1,2-polyadditon) by treatment of the allene polymer with a suitable reagent which cyclizes said allene polymer. Said soluble ladder spiro polymer contains substantially less unsaturation than the allene polymer.

Polyallene has been prepared by a variety of catalysts. For example, W. P. Baker, J. Polymer Sci., A1, 655 (1963) describes the polymerization of allene using a variety of transition metal catalysts. A major portion of the polymer structure consists of units resulting from 1,2- polyaddition, as exhibited by pendant methylene structures

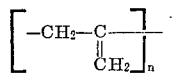

along the polymer chains.

In addition to methylene structure, Baker also discloses evidence for cis-double bonds and also for vinyl unsaturation.

Although any soluble polyallene which contains large proportions of methylene unsaturation may be used as the starting material of this invention, the most satisfactory results are found when the polyallene is synthesized using a catalyst based on nickel compounds, or using a catalyst based on rhodium compounds. The use of nickel compounds has been described by Otsuka et al. J. Am. Chem. Soc., 87, 3017 (1965). The use of rhodium compounds for the preparation of a soluble polyallene suitable for cyclization is included within the scope of this invention as a preferred method for the first step in the preparation of a ladder spiro polymer starting from monomeric allene. Polymerization catalysts prepared from rhodium compounds give polyallene containing exceptionally high proportions of 1,2-polyaddition. The proportion of soluble polymer can be increased by the addition of olefins or dienes to the polymerization recipe. When such olefins or idenes, for example 1,3-butadiene, are added to the polymerization recipe, the proportion of soluble to insoluble polyallene is increased. As shown by Tadokoro et al., J. Polmer Sci., B3, 697 (1965) the structure of crystalline polyallene is such that all methylene carbon-carbon double bonds lie substantially in one plane, on opposite sides of a spiral chain. In accordance with the present invention the conformation of such methylene groups along the polyallene chain, is ideally suited to cyclization reaction to a soluble polymer upon treatment with Lewis acid catalysts.

In the present invention the soluble polyallene prepared in accordance with the above-noted methods is cyclized to a soluble, high melting polymer having high stability to degradation by heat or light. The cyclization is conveniently effected by the action of Lewis Acids (such as those which are conveniently used for cationic polymerizations such as boron trifluoride, stannic chloride, titanium tetrachloride, aluminum chloride, aluminum bromide, aluminum trialkyl, etc.) on 1,2-polyallene dissolved in the solvents commonly employed in cationic polymerization. The solvents used are carefully dried and include butane, pentane, hexane, heptane, and other aliphatic hydrocarbons; benzene, toluene, xylene and other liquid aromatic hydrocarbons; tetrahydrofuran, and other ethers; nitrobenzene, nitroethane, etc.

The cyclization reaction consists of making a solution of polyallene in any of the solvents listed above. To this solution is added the Lewis acid catalyst in an amount sufficient to effect cyclization.

The temperature used for the cyclization reaction is usually not critical and conveniently lies between room temperature and the boiling point of the solvent. (Usually about 60° C. to 150° C.)

The time held for the cyclization reaction to go to completion depends upon the temperature of the solvent and Lewis acid employed and usually ranges from about one hour to one or more days.

The amount of Lewis acid catalyst used for cyclization, is usually not critical and ranges from between about 0.001 to 1.0 mole of catalyst per mole of unsaturation.

Upon completion of the cyclization reaction (as determined by analysis of an aliquot sample of the reaction medium), excess catalyst is destroyed by addition of a small amount of reagent such as water, methanol, ammonia, amine compounds etc., and the solution of cyclized polyallene is poured into a suitable non-solvent such as an alcohol such as methanol etc. to precipitate the polymeric product. The product may be removed by any convenient method such as filtration, etc.

This cyclization of soluble 1,2-polyallene leads to the formation of a soluble polymer containing no residual methylene unsaturation. Methylene unsaturation on alternate sides of the chain of the polyallene starting material are thus incorporated into the three dimensional network of the ladder spiro polymer. No crosslinking between polymer chains results from the cyclization reaction.

The cyclized polymer of this invention is characterized by (1) high solubility in common organic solvents such as benzene, chloroform, etc. (2) a melting point of about 235-260° C., compared with a melting point of about 125° C. for polyallene, and (3) by high heat stability.

Generally, only the methylene unsaturation of the polyallene is incorporated into the cyclization reaction. It is therefore advantageous to use as starting material, soluble polyallene containing relatively high proportions of methylene unsaturation.

Infrared spectra of the polyallene used as a starting material in the present invention typically show three types of carbon-carbon double bond unsaturation: methylene, internal cis-double bond, and vinyl. Nuclear magnetic resonance spectra show in-chain [—$CH_2$—] groups at $2.65\delta$ as well as pendant methylene unsaturation at $4.83\delta$, in the ratio 1:1. Types of unsaturation other than pendant methylene appear as a broad band under the sharp peak at $4.83\delta$.

Cyclized polyallene on the other hand shows no evidence of methylene unsaturation in the infrared spectrum, and some evidence of cis and vinyl unsaturation. The nuclear magnetic resonance spectrum reveals no peak at $4.83\delta$, some cis and vinyl unsaturation which appear as a broad peak centered at about $5.20\delta$, and saturated methylene absorbtion with a main broad peak at $1.65\delta$ and a second broader peak at about $1.0\delta$. Examination of a molecular model of cyclized polyallene, a representation of which is shown in the attached drawing, reveals two different types of methylene protons. In one type of chain of alternating spiro and methylene carbons shown in the drawing a line connecting the two hydrogens on any one methylene carbon is perpendicular to a line drawn parallel to the polymer chain. In the other type of chain shown in the drawing the hydrogens on the methylene groups are arranged such that a line connecting any two hydrogens on one methylene group is parallel to the direction of the chain, and this line intersects hydrogens on the next methylene carbon which is in the same plane. The attached illustration clearly shows that the polymer covered in the instant invention is both a ladder and a spiro polymer.

The following examples serve to illustrate the invention.

EXAMPLE 1

To a solution of 0.5 g. of bis (cycloocta-1,5-diene) dirhodiumdichloride [for preparation see Chatt and Venanzi, J. Chem. Soc., 4735 (1957)] in 300 ml. of benzene and 10 ml. of n-butyraldehyde in an autoclave was added 13.6 g. of allene. After heating at 52° C. with stirring for 45 hours, the solution was cooled, excess allene removed by venting, and the mixture was poured into methanol containing phenyl-β-naphthylamine. The polymer which precipitated was removed by filtration, washed with more methanol containing phenyl-β-naphthylamine, filtered then dried under vacuum to give 5.51 g. of crystalline polyallene melting at 114–127° C. A 2.0 g. portion of this crystalline polyallene was heated to reflux in 250 ml. of benzene containing a small amount of phenyl-β-naphthylamine, filtered through a heated funnel, and the filtrate poured into methanol. There was obtained 1.78 g. of benzene soluble crystalline polyallene, melting at 122–125° C.

A 1.0 g. portion of the soluble crystalline polyallene was dissolved in 105 ml. of dry benzene. The solution was heated to boiling under reflux to dissolve the polyallene, then allowed to cool to slightly below the boiling point. To this hot solution was added 0.5 ml. of boron trifluoride etherate. The solution was allowed to cool to room temperature, and was then poured into methanol containing a small amount of phenyl-β-napthaylamine. The polymer was removed by filtration and dried under vacuum, to give 0.84 g. of cyclized polyallene, which melted at 215–250° C.

A portion of the cyclized 1,2-polyallene was analyzed: Calculated for $C_3H_4$ percent: C, 89.94; H, 10.06. Found (percent): C, 88.33, 87.83, 89.33; H, 9.86, 9.71, 10.29.

A portion of the cyclized polyallene was heated at 300° C. for several minutes. No darkening was observed, and the polymer retained a good flow property.

The cyclized polyallene was determined by X-ray diffraction to be amorphous. The infrared spectrum showed no absorption characteristic of the methylene unsaturation of polyallene, but showed some traces of aromatic unsaturation. A nuclear magnetic resonance spectrum obtained in deuterated chloroform (tetramethyl silane as the internal standard) showed no peak at 4.83δ, characteristic of 1,2-polyallene. There was a small peak at 7.23δ (4% of the total protons) attributed to aromatic unsaturation arising from alkylation of the benzene solvent by cations on the cyclizing polymer chain, and a broad band centered at about 5.2δ attributed to cis and vinyl unsaturation in the polymer (9% of the total protons) and the remaining 87% of the protons in a broad region with a principal peak of 1.65δ attributed to saturated carbons of the cyclized polyallene.

EXAMPLE 2

To a suspension of 0.5 g. of tetrakis (ethylene) dirhodiumdichloride [for preparation see R. Cramer, Inorg. Chem. 1, 722 (1962)] in 100 ml. of ether was added 5 ml. of butadiene. The suspension was shaken at room temperature for 10 minutes, and insoluble material was removed by filtration. The filtrate was evaporated to dryness under vacuum to give 0.3 g. of yellow tris (butadiene) dirhodiumdichloride.

To a solution of 0.25 g. of the tris (butadiene) dirhodiumdichloride dissolved in 300 ml. of benzene in an autoclave which had been purged with argon, was added 16.9 g. of allene. The autoclave was heated at 51° C. with stirring for 46 hours, and cooled. Excess allene was vented before the autoclave was opened, and the contents poured into methanol containing a small amount of phenyl-β-naphthylamine. The polymer was removed by filtration, washed with more methanol, and dried first by filtration then under high vacuum. There was obtained 1.5 g. of crystalline polyallene.

This crystalline polyallene was dissolved in boiling benzene, filtered while hot, to give 0.57 g. of benzene-soluble polyallene, melting point 124–126° C.

The beneze-soluble polyallene was dissolved in 100 ml. of dry benzene heated to reflux, and allowed to cool slightly below the boiling point. To the hot solution was added 0.5 ml. of boron trifluoride etherate. The solution was allowed to cool to room temperature, then the mixture was poured into methanol containing a small amount of phenyl-β-naphthylamine. The polymer was removed by filtration and dried, to give 0.44 g. of soluble cyclized polyallene. The cyclized polyallene, when heated on a melting block, melted at 227–239° C.

The nuclear magnetic resonance spectrum of cyclized polyallene dissolved in deuterated chloroform showed no evidence of aromatic unsaturation, residual unsaturation amounting to 8% of the total protons around 5.2δ, and saturated protons accounting for 92% of all the protons in a broad peak centered at about 1.65δ, with a broader peak at about 1.0δ.

EXAMPLE 3

To a solution which had been placed in an autoclave and purged with argon of 0.5 g. bis (cycloocta-1,5-diene) dirhodiumdichloride (see Example 1) was dissolved in 300 ml. of benzene, was added 9.3 g. butadiene and 34.6 g. of allene. The solution was heated to 53° C. for 45 hours, then cooled to room temperature. Butadiene and excess allene were removed by venting, the autoclave was opened, and the contents were poured into methanol containing a small amount of phenyl-β-naphthylamine. There was obtained 5.2 g. of crystalline polyallene, which by analysis by X-ray diffraction and by infrared spectroscopy showed no evidence of butadiene copolymer.

The crystalline polyallene prepared above was dissolved in boiling benzene and filtered while hot, then poured into methanol containing phenyl-β-naphthylamine. There was obtained 3.3 g. of benzene-soluble crystalline polyallene.

A 0.4 g. portion of the soluble polyallene in 20 ml. of dry benzene was heated to boiling. The solution was cooled slightly and 0.2 ml. of titanium tetrachloride was added. The solution was again heated to reflux for more than one hour, then cooled to 50° C., and maintained at 50° C. for 135 hours. The mixture was cooled, then added to methanol containing phenyl-β-naphthylamine. There was obtained 0.07 g. of soluble cyclized polyallene.

The nuclear magnetic resonance spectrum showed no evidence of unsaturation. There was a broad absorption through the region expected for protons on saturated hydrocarbon polymer.

EXAMPLE 4

Into a dried reaction tube was placed 17 ml. of dry heptane and 2 ml. of a 0.05 M solution of vanadyl trichloride in dry heptane. The tube was sealed with a Crown cap, butyl cushion, and Teflon liner. The tube was cooled with liquid nitrogen, and 0.025 mole of allene was added through the cap. The tube was warmed with stirring to 50° C. under positive pressure of nitrogen. Then 0.83 ml. of aluminum triisobutyl was added and the tube shaken. Polyallene formed almost immediately. The tube was stirred for 7 minutes in a 25° C. water bath. To the mixture in the tube was added 10 ml. of 1:1 hydrochloric acid solution to terminate the reaction and hydrolyze excess catalyst. After standing, the acid layer which separated from the hydrocarbon layer and polymer was removed. The hydrocarbon layer and polymer was washed with 10 ml. of water, separated from the water, then poured into 100 ml. of methanol containing small amounts of phenyl-β-naphthylamine. The polymer was washed successively with water and with methanol containing phenyl-β-naphthylamine. The polymer was removed and dried under high vacuum to give 0.199 g. of polyallene melting at 100–110° C. The X-ray diffraction pattern resembled the pattern of the polymer of Example 1. The intrinsic viscosity measured in bromobenzene at 135° C. was 2.36. A small portion (0.126 g.) of the soluble crystalline polyallene prepared from the vanadyl catalyst was dissolved in 100 ml. of dry benzene and heated under reflux to dissolve the polymer. The solution was allowed to cool slightly, then 0.5 ml. of boron trifluoride etherate was added to the hot solution. The solution was stirred for one hour, then was heated under reflux for 6 hours. The solution was allowed to cool, then poured into methanol containing a little phenyl-β-naphthylamine. There was obtained 0.093 g. of soluble cyclized polyallene. The cyclized polymer melted at 180–220° C. Upon heating to 300° C. for 10 minutes, the sample remained transparent and flowed well. The sample was cooled to room temperature. Upon reheating, the sample melted at 190–220° C. The infrared spectrum of the soluble material resembled the spectra of Examples 1, 2, and 3.

EXAMPLE 5

A solution containing 0.5 g. of bis (cycloocta-1,5-diene) dirhodiumdichloride (see Example 1) in 300 ml. of benzene was placed in an autoclave and flushed with argon. The autoclave was sealed and 12.5 g. of allene was added. The solution was heated at 55° C. for 45 hours, then cooled, and the excess allene was vented. The autoclave was opened and the solution was poured into methanol containing a small amount of phenyl-$\beta$-naphthylamine. There was obtained 1.5 g. of crystalline polyallene, melting point at 119–125° C.

A 0.25 g. portion of the benezene-soluble crystalline polyallene was dissolved in 25 ml. of boiling benzene, then 0.05 ml. of boron trifluoride etherate was added to the boiling solution. The reaction vessel was sealed, then heated at 50° C. for 16.7 hours. The solution was cooled, then poured into ethanol containing phenyl-$\beta$-naphthylamine. The polymer was removed by filtration, and dried to give 0.215 g. of cyclized polyallene, melting at 240–290° C., soluble at room temperature in chloroform and in benzene.

The thermally stable polymer of the present invention may be used in any type of fabricated article where heat build up may pose a problem. Examples of such use are paneling, sheeting or piping used in electrical equipment or internal combustion engines, etc.

A suitable polymerization catalyst used in the preparation of soluble crystalline polyallene has the general formula $(RhXY_m)_n$ where Rh is rhodium, X is a halogen selected from bromine, chlorine, iodine or fluorine, Y is a cyclic or non cyclic mono-, tri-, or tetra-unsaturated hydrocarbon consisting generally of from about 2 to 20 carbon atoms, $n$ is an integer less than 4 and $m$ is an integer of 1 or 2 when $n$ is 1, and $m$ is 0.5, 1.0, 1.5, or 2 when $n$ is 2 or more.

Lewis acids which are suitable as cyclization catalysts can be represented by the general formula $(MX_3)$ wherein M is a Group III metal of atomic weight generally less than about 28, and X is a halogen of atomic weight generally less than about 128.

Having thus described my invention what I claim and desire to protect by Letters Patent is:

1. A soluble ladder spiro polymer characterized by substantially no methylene unsaturation, comprising cyclized 1,2-polyallene consisting of —CH$_2$— groups which alternate with carbon atoms, wherein each of said carbon atoms is common to three rings and is connected to four —CH$_2$— groups.

2. A process for preparing the composition of claim 1 which consists of treating soluble polyallene containing a substantial proportion of methylene unsaturation with a Lewis acid of sufficient strength to convert said pendent methylene unsaturated double bonds into a soluble polymer containing substantially less total unsaturation.

3. The process of claim 2 wherein the polyallene which contains substantial proportions of methylene unsaturation is obtained by treating 1,2-propadiene with a catalyst which gives crystalline solution polyallene with a high proportion of units resulting from a 1,2 addition.

4. The process of claim 3 wherein the catalyst used to prepare said soluble crystalline polyallene consists of a transition metal halide in combination with an aluminum alkyl, and wherein said resulting polyallene is treated in a solution with said Lewis acid.

5. The process of claim 3 wherein soluble crystalline polyallene is prepared using a catalyst consisting of a compound having the general formula $(RhXY_m)_n$ wherein Rh is rhodium, X is a halogen selected from bromine, chlorine, iodine or fluorine, Y is a cyclic or non-cyclic mono-, di-, tri-, or tetra-unsaturated hydrocarbon consisting generally of from about 2 to 20 carbon atoms, $n$ is an integer less than four and $m$ is an integer of 1 or 2 when $n$ is 1, and $m$ is 0.5, 1.0, 1.5 or 2 when $n$ is 2 or more.

6. The process of claim 5 wherein an organic unsaturated compound selected from the group consisting of dienes, olefins, aldehydes and methyl methacrylate is used in conjunction with said catalyst in order to increase the proportion of polyallene which is soluble and which contains substantial proportions of methylene unsaturation along the hydrocarbon chain.

7. The process of claim 5 wherein the catalyst is bis (cycloocta-1,5-diene) dirhodiumdichloride.

8. The process of claim 5 wherein the catalyst is tetrakis (1,3-butadiene) dirhodiumdichloride.

9. The process of claim 5 wherein the catalyst is tris (1,3-butadiene) dirhodiumdichloride.

10. The process of claim 6 wherein the catalyst is bis (cycloocta-1,5 diene) dirhodiumdichloride and the unsaturated organic compound is 1,3-butadiene.

11. The process of claim 6 wherein the catalyst is bis (cycloocta-1,5 diene) dirhodiumdichloride and the unsaturated organic compound is methyl methacrylate.

12. The process of claim 6 wherein the catalyst is tris(1,3-butadiene) dirhodiumdichloride and the unsaturated organic compound is 1,3-butadiene.

13. The process of claim 3 wherein the Lewis acid is selected from the group consisting of compounds with the general formula $MX_3$, wherein M is a Group III metal of atomic weight generally less than about 28, and X is a halogen of atomic weight generally less than about 128.

14. The process of claim 3 wherein the Lewis acid is boron trifluoride.

15. The process of claim 3 wherein the Lewis acid is titanium tetrachloride.

16. The process of claim 3 wherein the catalyst is bis(cycloocta-1,5-diene) dirhodiumdichloride and the Lewis acid is boron trifluoride.

17. The process of claim 4 wherein the transition metal halide is vanadyl trichloride.

References Cited

UNITED STATES PATENTS

| | | | |
|---|---|---|---|
| 3,151,104 | 9/1964 | Robinson | 260—94.3 |
| 3,405,112 | 10/1968 | Otsuka et al. | 260—93.1 |
| 3,442,883 | 5/1969 | Shier | 260—94.3 |

FOREIGN PATENTS 673,354   10/1963   Canada.

JOSEPH L. SCHOFER, Primary Examiner

R. A. GAITHER, Assistant Examiner

U.S. Cl. R.X.

260—94.3, 94.7